(12) United States Patent
Hattori

(10) Patent No.: US 11,718,513 B2
(45) Date of Patent: Aug. 8, 2023

(54) POSITION AND POSTURE ESTIMATION SYSTEM

(71) Applicant: KABUSHIKI KAISHA TOYOTA JIDOSHOKKI, Kariya (JP)

(72) Inventor: Shingo Hattori, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 258 days.

(21) Appl. No.: 17/016,721

(22) Filed: Sep. 10, 2020

(65) Prior Publication Data

US 2021/0078843 A1 Mar. 18, 2021

(30) Foreign Application Priority Data

Sep. 13, 2019 (JP) .................................. 2019-167673

(51) Int. Cl.
*G06T 7/70* (2017.01)
*G01S 17/894* (2020.01)
(Continued)

(52) U.S. Cl.
CPC .............. *B66F 9/0755* (2013.01); *G06T 7/70* (2017.01); *G01S 17/894* (2020.01); *G06T 7/73* (2017.01);
(Continued)

(58) Field of Classification Search
CPC ...................... B66F 9/0755; G06T 7/70; G06T 2207/10016; G06T 2207/30164;
(Continued)

(56) References Cited

U.S. PATENT DOCUMENTS 8,965,561 B2 * 2/2015 Jacobus ............... G05D 1/0274
700/229
2017/0243372 A1 8/2017 Iida et al.
(Continued)

FOREIGN PATENT DOCUMENTS

JP 2-110100 A 4/1990
JP 2016-210586 A 12/2016
(Continued)

OTHER PUBLICATIONS

Aref et al. ("A multistage controller with smooth switching for Autonomous Pallet Picking," 2016 IEEE International Conference on Robotics and Automation (ICRA), Jun. 9, 2016, pp. 2535-2542, doi: 10.1109/ICRA.2016.7487408.) (Year: 2016).*
(Continued)

*Primary Examiner* — Daniel R Miller
*Assistant Examiner* — Christian T Bryant
(74) *Attorney, Agent, or Firm* — Sughrue Mion, PLLC

(57) ABSTRACT

Provided is a position and posture estimation system including: a laser sensor that detects a distance to a pallet; a plane equation calculation unit that calculates a plane equation of a front surface of the pallet on the basis of detection data of the laser sensor; and an estimation computation unit that estimates the position and the posture of the pallet by using the plane equation of the front surface of the pallet which is calculated by the plane equation calculation unit. The estimation computation unit calculates a yaw angle, a pitch angle, and a roll angle of the pallet as the posture of the pallet.

4 Claims, 6 Drawing Sheets

(51) Int. Cl.
*G06T 7/73* (2017.01)
*B66F 9/075* (2006.01)

(52) U.S. Cl.
CPC .............. *G06T 2207/10016* (2013.01); *G06T 2207/10028* (2013.01); *G06T 2207/30164* (2013.01); *G06T 2207/30252* (2013.01)

(58) Field of Classification Search
CPC ............. G06T 7/73; G06T 2207/10028; G06T 2207/30252; G01S 17/894
See application file for complete search history.

(56) References Cited

U.S. PATENT DOCUMENTS

| | | | |
|---|---|---|---|
| 2018/0089517 A1* | 3/2018 | Douglas | G06T 7/74 |
| 2018/0120465 A1* | 5/2018 | Rose | B66F 9/063 |
| 2018/0155169 A1 | 6/2018 | Tanaka et al. | |
| 2020/0031645 A1 | 1/2020 | Uchimura et al. | |
| 2020/0223676 A1 | 7/2020 | Shah et al. | |

FOREIGN PATENT DOCUMENTS

| | | |
|---|---|---|
| JP | 2017-151650 A | 8/2017 |
| JP | 2018-20881 A | 2/2018 |
| JP | 2018-199560 A | 12/2018 |
| KR | 10-2011-0027460 A | 3/2011 |

OTHER PUBLICATIONS

Xiao et al. (Pallet recognition and localization using an RGB-D camera, International Journal of Advanced Robotic Systems, Nov. 26, 2017, https://doi.org/10.1177/1729881417737799) (Year: 2017).*
Varga et al. (Vision-based autonomous load handling for automated guided vehicles. Proceedings—2014 IEEE 10th International Conference on Intelligent Computer Communication and Processing, ICCP 2014. 239-244. 10.1109/ICCP.2014.6937003.) (Year: 2014).*

* cited by examiner

POSITION AND POSTURE ESTIMATION SYSTEM

TECHNICAL FIELD

The present disclosure relates to a position and posture estimation system.

BACKGROUND

For example, a technology disclosed in Japanese Unexamined Patent Publication No. 2018-20881 is known as a position and posture estimation system in the related art. The position and posture estimation system disclosed in Japanese Unexamined Patent Publication No. 2018-20881 includes a distance measurement sensor that measures a distance from an object, an object recognition unit that recognizes the object on the basis of a detection value of the distance measurement sensor, a fork pocket determination unit that detects a plurality of pockets existing in the object on the basis of the detection value of the distance measurement sensor, and determines two pockets as a fork pocket by using a fork pocket rule, a pallet determination unit that determines the object including the plurality of pockets determined as the fork pocket as a pallet by using a pallet rule, and a position calculation unit that calculates coordinates of the fork pocket and the pallet.

In the related art, a position of the fork pocket and the pallet can be estimated on the basis of the fork pocket rule and the pallet rule, but a posture of the pallet cannot be estimated with high accuracy.

An object of the present disclosure is to provide a position and posture estimation system capable of estimating a position and a posture of a pallet that is a cargo handling target with respect to a fork lift with high accuracy.

SUMMARY

According to an aspect of the present disclosure, there is provided a position and posture estimation system that estimates a position and a posture of a pallet that is a cargo handling target with respect to a fork lift including a pair of forks. The position and posture estimation system includes: a distance detection unit that detects a distance to the pallet; a plane equation calculation unit that calculates a plane equation of a front surface of the pallet on the basis of detection data of the distance detection unit; and an estimation computation unit that estimates the position and the posture of the pallet by using the plane equation of the front surface of the pallet which is calculated by the plane equation calculation unit. The estimation computation unit calculates a yaw angle, a pitch angle, and a roll angle of the pallet as the posture of the pallet. Other aspects and advantages of the invention will become apparent from the following description, taken in conjunction with the accompanying drawings, illustrating by way of example the principles of the invention.

DETAILED DESCRIPTION

Hereinafter, an embodiment of the present disclosure will be described in detail with reference to the accompanying drawings.

Figure 1:
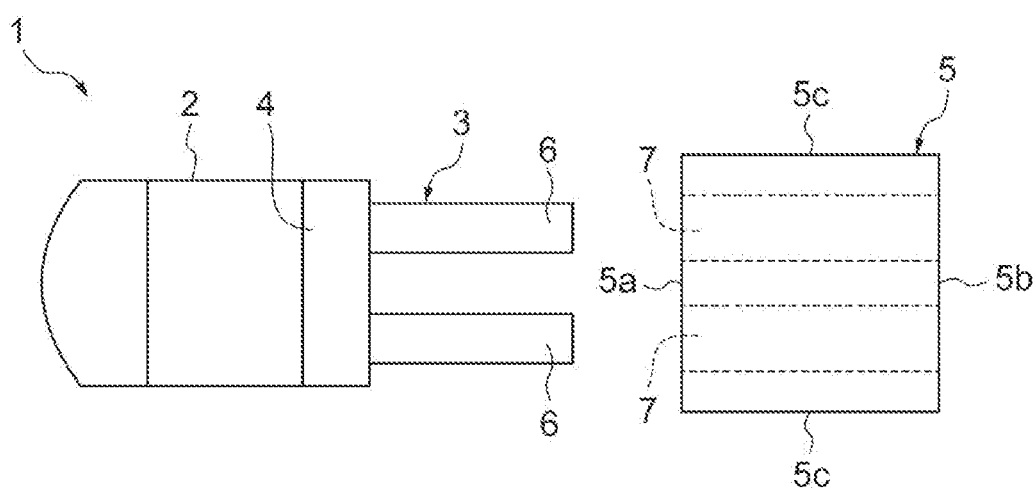
FIG. 1 is a schematic plan view illustrating a fork lift on which a position and posture estimation system according to an embodiment of the present disclosure is mounted in combination with a pallet that is a cargo handling target.

FIG. 1 is a schematic plan view illustrating a fork lift on which a position and posture estimation system according to an embodiment of the present disclosure is mounted in combination with a pallet that is a cargo handling target. In FIG. 1, a fork lift 1 includes a vehicle body 2, and a cargo handling device 3 that is disposed on a front side of the vehicle body 2 and performs cargo handling. The cargo handling device 3 includes a mast 4 formed on a front end portion of the vehicle body 2, and a pair of forks 6 that is attached to the mast 4 to be able to move up and down and lifts up a pallet 5.

The pallet 5 is a cargo handling structure on which a luggage is loaded. For example, the pallet 5 is a flat pallet. For example, the pallet 5 has a square shape in plan view. The pallet 5 includes a front surface $5a$, a rear surface $5b$ that is opposite to the front surface $5a$, and two side surfaces $5c$ orthogonal to the front surface $5a$ and the rear surface $5b$. The front surface $5a$ is a surface that faces the fork lift 1 when the pallet 5 is lifted up by the forks 6. The pallet 5 is provided with two fork holes 7 into which the pair of forks 6 are inserted. The fork holes 7 extend from the front surface $5a$ to the rear surface $5b$ of the pallet 5. A shape of the fork holes 7 is a rectangular shape in plan view (refer to FIG. 5).

Figure 2:
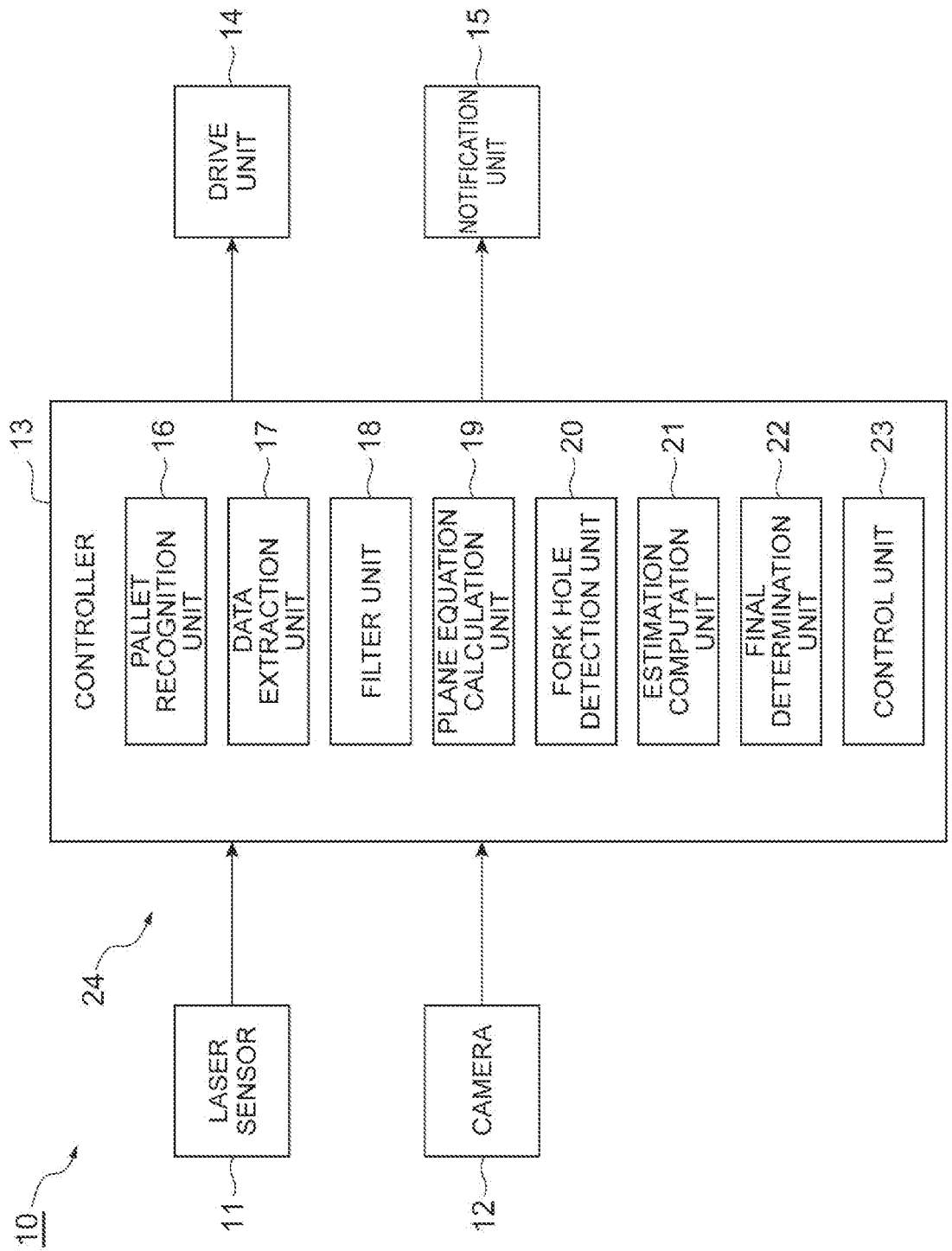
FIG. 2 is a schematic configuration diagram illustrating an automatic operation system including the position and posture estimation system according to the embodiment of the present disclosure.

FIG. 2 is a schematic configuration diagram illustrating an automatic operation system including the position and posture estimation system according to the embodiment of the present disclosure. In FIG. 2, an automatic operation system 10 is a system that performs an automatic operation of the fork lift 1. The automatic operation system 10 is mounted on the fork lift 1. The automatic operation system 10 includes a laser sensor 11, a camera 12, a controller 13, a drive unit 14, and a notification unit 15.

The laser sensor 11 is a distance detection unit that detects a distance to the pallet 5 as a cargo handling target. The laser sensor 11 emits laser toward the pallet 5 and receives reflected light of the laser to measure the distance to the pallet 5. The laser sensor 11 emits 3D (i.e., three-dimensional) laser. The camera 12 is an imaging unit that images the pallet 5 as a cargo handling target.

For example, the drive unit 14 includes a travel motor that rotates drive wheels and a steering motor that steers a steering wheel. Examples of the notification unit 15 include a display device, an alarm device, and the like.

The controller 13 includes a CPU, a RAM, a ROM, an input/output interface, and the like. The controller 13 includes a pallet recognition unit 16, a data extraction unit 17, a filter unit 18, a plane equation calculation unit 19, a fork hole detection unit 20, an estimation computation unit 21, a final determination unit 22 (determination unit), and a control unit 23.

Here, the laser sensor 11, the camera 12, the pallet recognition unit 16, the data extraction unit 17, the filter unit 18, the plane equation calculation unit 19, the fork hole detection unit 20, the estimation computation unit 21, and the final determination unit 22 constitute a position and posture estimation system 24 of this embodiment. The position and posture estimation system 24 is a device that estimates a position and a posture of the pallet 5 as a cargo handling target with respect to the fork lift 1. The pallet 5 as a cargo handling target is a pallet for which cargo handling is to be initiated by the cargo handling device 3, and is located in front of the fork lift 1.

The pallet recognition unit 16 recognizes the pallet 5 on the basis of captured image data of the camera 12. The data extraction unit 17 extract measurement point data corresponding to the pallet 5 recognized by the pallet recognition unit 16 in measurement point data (detection data) of the laser sensor 11. The filter unit 18 performs filtering processing to the measurement point data of the laser sensor 11 which is extracted by the data extraction unit 17.

The plane equation calculation unit 19 calculates a plane equation of the front surface 5a of the pallet 5 on the basis of the measurement point data of the laser sensor 11 which is subjected to the filtering processing by the filter unit 18. The fork hole detection unit 20 detects the two fork holes 7 on the basis of the plane equation of the front surface 5a of the pallet 5 which is calculated by the plane equation calculation unit 19.

The estimation computation unit 21 estimates a position and a posture of the pallet 5 by using the plane equation of the front surface 5a of the pallet 5. At this time, the estimation computation unit 21 calculates a yaw angle, a pitch angle, and a roll angle of the pallet 5 as the posture of the pallet 5. The estimation computation unit 21 calculates the yaw angle and the pitch angle of the pallet 5 on the basis of the plane equation of the front surface 5a of the pallet 5, and calculates the roll angle of the pallet 5 on the basis of a positional relationship between the two fork holes 7 detected by the fork hole detection unit 20.

The final determination unit 22 finally determines whether or not dimensions of the front surface 5a of the pallet 5 of which the position and the posture are estimated by the estimation computation unit 21 match defined values determined in advance.

The control unit 23 controls the drive unit 14 to move the fork lift 1 to a nearby position in front of the pallet 5 as a cargo handling target on the basis of the position and the posture of the pallet 5 which are estimated by the estimation computation unit 21.

Figure 3:
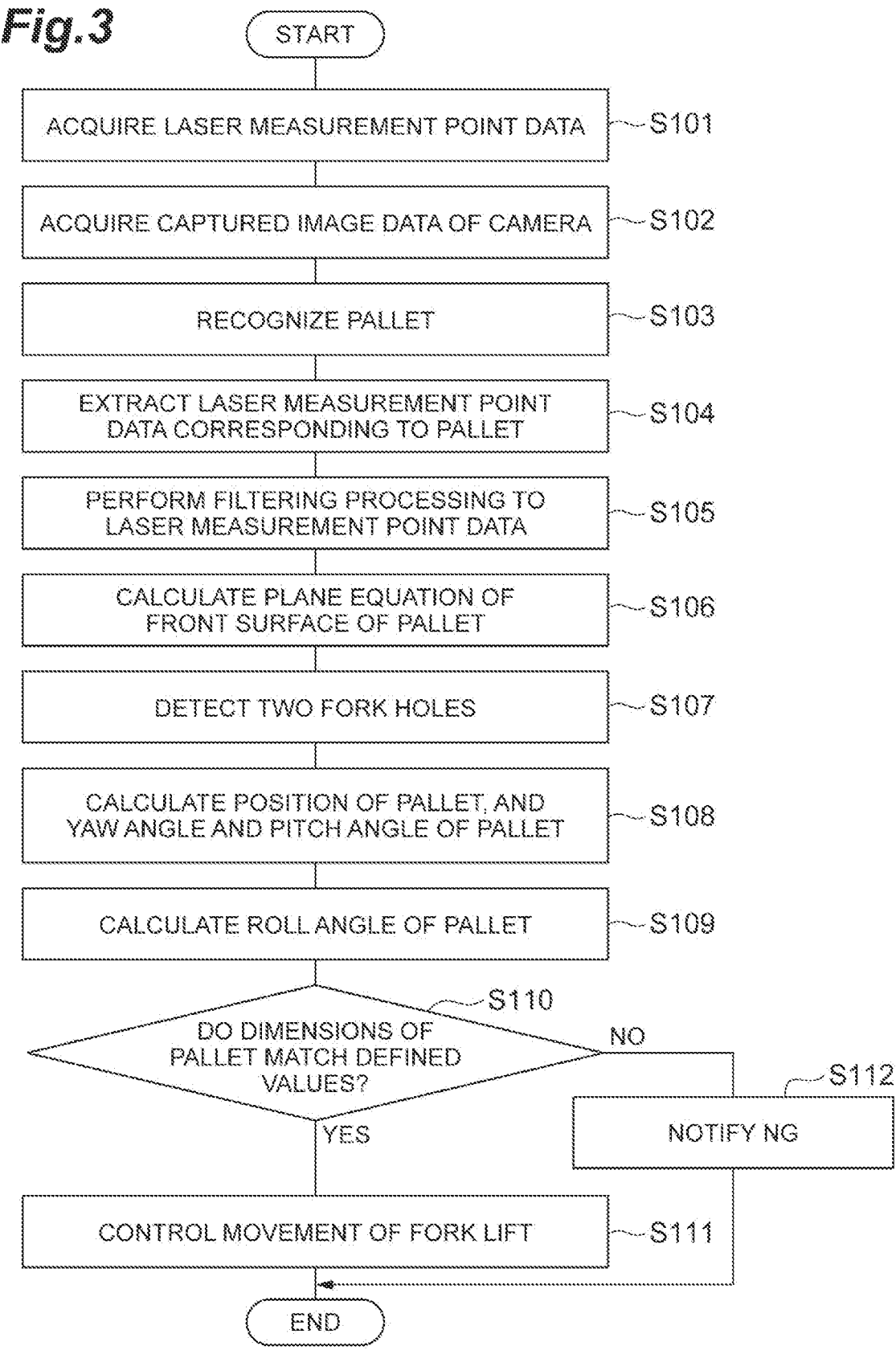
FIG. 3 is a flowchart illustrating details of an estimation and control procedure executed by a controller illustrated in FIG. 2.

FIG. 3 is a flowchart illustrating details of an estimation and control procedure that is executed by the controller 13. For example, this processing is executed when an instruction for initiation of automatic operation of the fork lift 1 is given.

Figure 4:
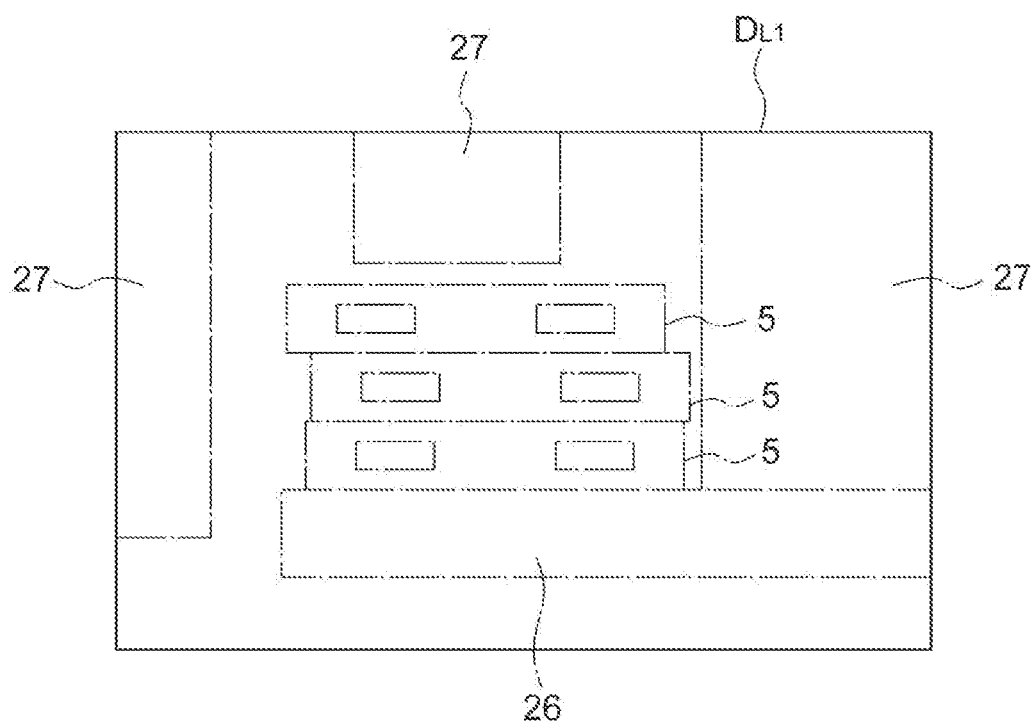
FIG. 4 is a view schematically illustrating an example of laser measurement point data.

In FIG. 3, the controller 13 acquires measurement point data (hereinafter, referred to as laser measurement point data) of the laser sensor 11 (step S101). In FIG. 4, an example of the laser measurement point data is schematically illustrated. FIG. 4 illustrates laser measurement point data $D_{L1}$ relating to a state in which the pallet 5 is stacked in three layers and a plurality of objects 27 other than the pallet 5 are disposed on a mounting base 26. With respect to a pallet 5 on the laser measurement point data $D_{L1}$, the same reference numeral as in an actual pallet 5 will be given for convenience.

Figure 5:
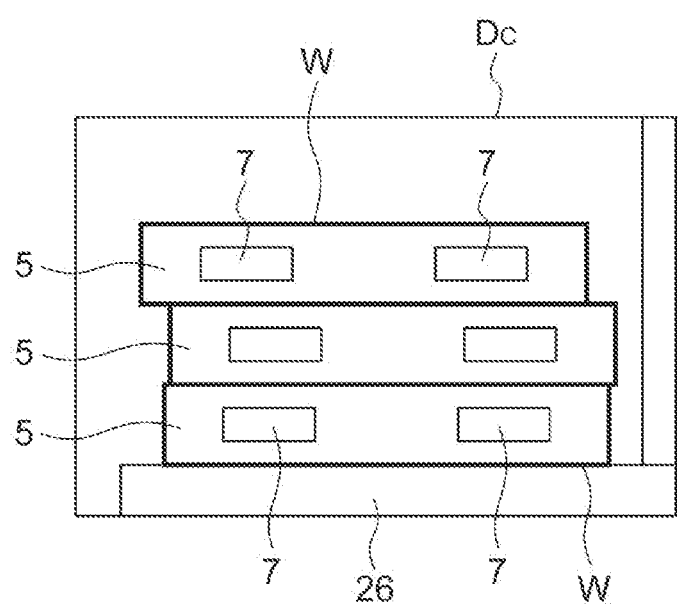
FIG. 5 is a view illustrating an example of captured image data of a camera.

Next, the controller 13 acquires captured image data of the camera 12 (step S102). In FIG. 5, an example of the captured image data of the camera 12 is illustrated. In captured image data Dc illustrated in FIG. 5, pallets 5 which are stacked on three layers on the mounting base 26 are photographed.

In addition, the controller 13 recognizes the pallet 5 by an image processing technology using deep learning on the basis of the captured image data of the camera 12 (step S103).

The deep learning is one of elemental technologies of artificial intelligence. The deep learning is learning using deep neutral network in which a machine automatically extracts features from data without human power when a sufficient data amount is present. In the deep learning, an intermediate layer between an input layer and an output layer is set to a multi-layer, and thus information transmission and processing are increased. Accordingly, it is possible to increase accuracy and versatility, or it is possible to improve prediction accuracy.

Specifically, as illustrated in FIG. 5, the controller 13 designates a frame line W to surround the pallet 5 in the captured image data Dc. The frame line W is a rectangular frame called a bounding box in object detection using the deep learning. In addition, the controller 13 recognizes the pallet 5 by comparing the captured image data Dc for which the frame line W is designated with learning data.

Figure 6A:
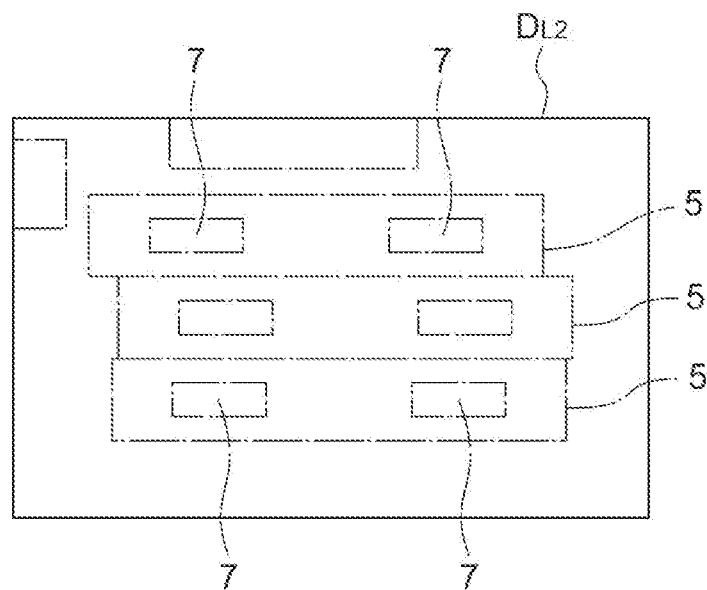
FIG. 6A and FIG. 6B are views schematically illustrating an example of laser measurement point data before and after filtering processing is performed by a filter unit illustrated in FIG. 2.

Next, the controller 13 extracts laser measurement point data corresponding to the pallet 5 recognized in step S103 in the laser measurement point data which are acquired in step S101 (step S104). According to this, as illustrated in FIG. 6A, laser measurement point data $D_{L2}$ including the laser measurement point corresponding to the recognized pallet 5 in the laser measurement point data $D_{L1}$ is obtained.

Figure 6B:
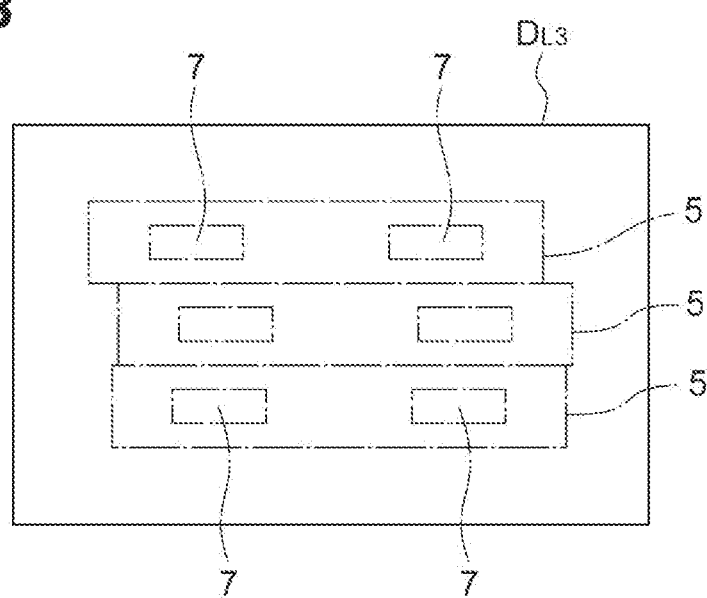

Next, the controller 13 performs filtering processing to the laser measurement point data extracted in step S104 (step S105). At this time, a laser measurement point of which a point density is lower than a predetermined amount is removed. According to this, as illustrated in FIG. 6B, laser measurement point data $D_{L3}$ from which a laser measurement point corresponding to a noise other than the pallet 5 is removed is obtained.

Next, the controller 13 calculates a plane equation of the front surface 5a of the pallet 5 on the basis of the laser measurement point data obtained in step S105 (step S106). For example, the controller 13 obtains the plane equation of the front surface 5a of the pallet 5 by removing laser measurement points other than the laser measurement point corresponding to a plane in the laser measurement point data as outliers, by using a robust estimation method such as random sample consensus (RANSAC). The robust estimation is a method for suppressing an influence of the outliers included in measurement value (here, laser measurement points). The plane equation of the front surface 5a of the pallet 5 may be calculated by using a least square method or the like instead of the robust estimation method.

Next, the controller 13 detects the two fork holes 7 on the basis of the plane equation of the front surface 5a of the pallet 5 which is calculated in step S106 (step S107). At this time, in the laser measurement point data, a region in which a point density of the laser measurement point is high is detected as the front surface 5a of the pallet 5, and two regions in which the point density of the laser measurement point is low are detected as the fork holes 7.

Next, the controller 13 calculates the position of the pallet 5, and the yaw angle and the pitch angle of the pallet 5, on the basis of the plane equation of the front surface 5a of the pallet 5 (step S108). The yaw angle of the pallet 5 is a rotation angle with an upper and lower direction (i.e., height direction) of the pallet 5 set as an axis. The pitch angle of the pallet 5 is a rotation angle with a left and right direction (i.e., width direction) of the pallet 5 set as an axis.

Next, the controller 13 calculates the roll angle of the pallet 5 on the basis of a positional relationship between the two fork holes 7 detected in step S107 (step S109). The roll angle of the pallet 5 is a rotation angle with a front and rear direction (i.e., a depth direction) of the pallet 5 set as an axis. Specifically, the controller 13 calculates central positions of the two fork holes 7, and calculates the roll angle of the pallet 5 from a relationship between the central positions of the two fork holes 7. Estimation calculation of the position of the pallet 5 may be performed on the basis of the positional relationship between the two fork holes 7.

Next, the controller 13 determines whether or not dimensions of respective portions in the front surface 5a of the pallet 5 of which the position and the posture are estimated in steps S108 and S109 match defined values determined in advance (step S110). The dimensions of the respective portions in the front surface 5a of the pallet 5 include a width and a height of the pallet 5, dimensions of the two fork holes 7, and a distance between centers of the two fork holes 7, and the like.

In a case where it is determined that the dimensions of the respective portions in the front surface 5a of the pallet 5 match the defined values, the controller 13 controls the drive unit 14 to move the fork lift 1 to a nearby position in front of the pallet 5 as a cargo handling target on the basis of the position and the posture of the pallet 5 (step S111). In a case where it is determined that the dimensions of the respective portions of the front surface 5a of the pallet 5 do not match the defined values, the controller 13 notifies the notification unit 15 of NG (step S112).

Here, the pallet recognition unit 16 executes steps S102 and S103. The data extraction unit 17 executes steps S101 and S104.

The filter unit 18 executes step S105. The plane equation calculation unit 19 executes step S106. The fork hole detection unit 20 executes step S107. The estimation computation unit 21 executes steps S108 and S109. The final determination unit 22 executes step S110. The control unit 23 executes steps S111 and S112.

As described above, in this embodiment, the distance to the pallet 5 is detected by the laser sensor 11, and the plane equation of the front surface 5a of the pallet 5 is calculated on the basis of the measurement point data of the laser sensor 11. In addition, the position and the posture of the pallet 5 are estimated by using the plane equation of the front surface 5a of the pallet 5. At this time, as the posture of the pallet 5, the yaw angle, the pitch angle, and the roll angle of the pallet 5 are calculated. According to this, estimation accuracy of the posture of the pallet 5 becomes high. As described above, it is possible to estimate not only the position of the pallet 5 as a cargo handling target but also the posture of the pallet 5 as the cargo handling target with high accuracy. In addition, even in a case where the distance between the pallet 5 and the fork lift 1 is large, it is possible to estimate the position and the posture of the pallet 5 as the cargo handling target with high accuracy without attaching a marker to the front surface 5a of the pallet 5.

In this embodiment, since the yaw angle and the pitch angle of the pallet 5 are calculated on the basis of the plane equation of the front surface 5a of the pallet 5, it is possible to obtain the yaw angle and the pitch angle of the pallet 5 in a simple and reliable manner. In addition, since the two fork holes 7 are detected on the basis of the plane equation of the front surface 5a of the pallet 5, and the roll angle of the pallet 5 is calculated on the basis of the positional relationship of the two fork holes 7, it is possible to obtain the roll angle of the pallet 5 in a simple and reliable manner.

In this embodiment, the pallet 5 is recognized on the basis of the captured image data of the camera 12, and measurement point data corresponding to the recognized pallet 5 in the measurement point data of the laser sensor 11 is extracted. The captured image data of the camera 12 has color information and has resolution higher than that of the measurement point data of the laser sensor 11. According to this, recognition accuracy of the pallet 5 becomes high. Accordingly, it is possible to estimate the position and the posture of the pallet 5 as a cargo handling target with high accuracy. In addition, it is possible to shorten time necessary the estimation of the position and the posture of the pallet 5.

In this embodiment, since a determination is made as to whether or not dimensions of the front surface 5a of the pallet 5 of which the position and the posture are estimated match defined values, it is possible to recognize whether or not the pallet 5 of which the position and the posture are estimated is appropriate as a pallet 5 as a cargo handling target.

In this embodiment, since the filtering processing is performed to the measurement point data of the laser sensor 11, the plane equation of the front surface 5a of the pallet 5 in a state in which measurement point data as a noise is removed is obtained. Accordingly, it is possible to estimate the position and posture of the pallet 5 as a cargo handling target with higher accuracy.

The present disclosure is not limited to the above-described embodiment. For example, in the embodiment, the pallet 5 is recognized by the image processing technology using the deep learning on the basis of the captured image data of the camera 12, but there is no particular limitation to the aspect. For example, the pallet 5 may be recognized by using template matching, pattern matching, or the like.

In the above-described embodiment, the pallet 5 is recognized on the basis of the captured image data of the camera 12, and the plane equation of the front surface 5a of the pallet 5 is calculated on the basis of the measurement point data corresponding to the recognized pallet 5 in the measurement point data of the laser sensor 11, but there is no particular limitation to the aspect. For example, the plane equation of the front surface 5a of the pallet 5 may be calculated on the basis of only the measurement point data of the laser sensor 11 without using the captured image data of the camera 12.

In the above-described embodiment, the distance to the pallet 5 is detected by the laser sensor 11 that emits laser. However, a distance detection unit that detects the distance to the pallet 5 is not particularly limited to the laser sensor 11, and for example, an infrared sensor that emits infrared rays or the like can be used.

What is claimed is:

1. A position and posture estimation system that estimates a position and a posture of a pallet that is a cargo handling target with respect to a fork lift including a pair of forks, comprising:
    a laser sensor that is configured to emit a laser toward the pallet and acquire detection data as reflected light of the laser to detect a distance to the pallet;
    a camera that is configured to image the pallet,
    a controller that is configured to perform:
        recognizing the pallet by comparing captured image data of the camera with learning data using deep learning; and extracting detection data corresponding to the recognized pallet in the detection data acquired by the laser sensor,
calculating a plane equation of a front surface of the pallet using the extracted detection data;
detecting two fork holes which are provided in the pallet and into which the pair of forks are inserted using the plane equation of the front surface of the pallet after calculating the plane equation;
estimating the position and the posture of the pallet using the plane equation of the front surface of the pallet,
   wherein, when estimating the posture of the pallet, the controller is configured to calculate a yaw angle and a pitch angle of the pallet using the plane equation of the front surface of the pallet, and calculate a roll angle of the pallet using a positional relationship of the detected two fork holes; and
controlling the forklift to move to a position in front of the pallet using the position and the posture of the pallet.

2. The position and posture estimation system according to claim 1, wherein the controller is further configured to determine whether a dimension of the front surface of the pallet of which the position and the posture are estimated matches a defined value determined in advance.

3. The position and posture estimation system according to claim 1,
   wherein the controller is further configured to perform filtering processing to the detection data obtained by the laser sensor,
   wherein the plane equation of the front surface of the pallet is calculated on the basis of the detection data subjected to the filtering processing.

4. The position and posture estimation system according to claim 1, wherein the controller is configured to detect a region in which a point density of a laser measurement point in the acquired detection data is high as the front surface of the pallet, and detect two regions in which the point density of the laser measurement point is low as the two fork holes, when detecting the two fork holes using the plane equation.

\* \* \* \* \*